S. D. ORSER.
VULCANIZER.
APPLICATION FILED JULY 10, 1917.
1,249,998.
Patented Dec. 11, 1917.
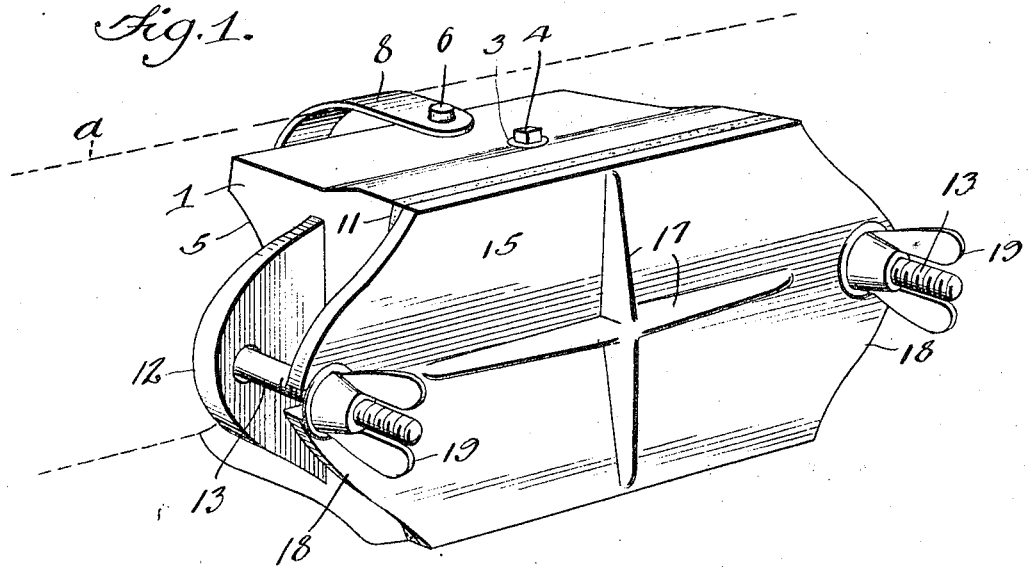
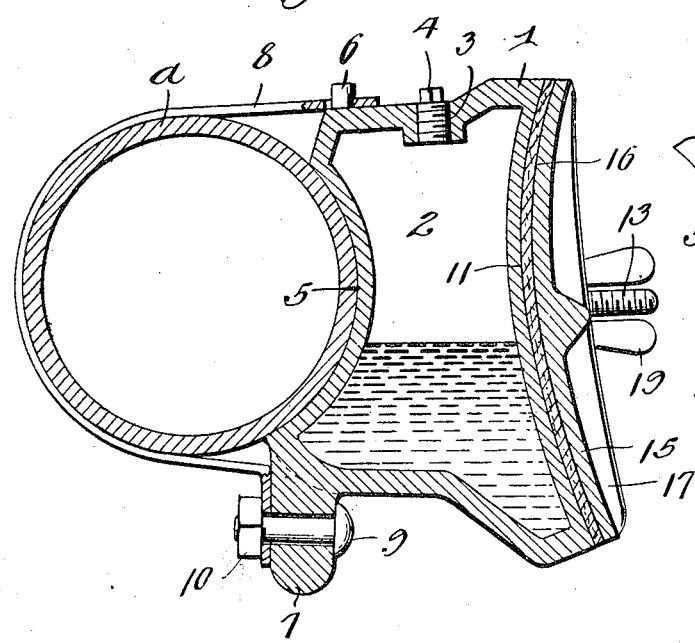
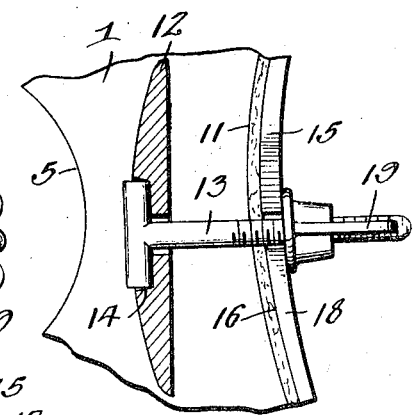
WITNESSES
INVENTOR
S. D. Orser,
BY Victor J. Evans
ATTORNEY

UNITED STATES PATENT OFFICE.

SAMUEL D. ORSER, OF RUSSELLVILLE, ALABAMA.

VULCANIZER.

1,249,998.  Specification of Letters Patent.  Patented Dec. 11, 1917.

Application filed July 10, 1917. Serial No. 179,759.

*To all whom it may concern:*

Be it known that I, SAMUEL D. ORSER, a citizen of the United States, residing at Russellville, in the county of Franklin and State of Alabama, have invented new and useful Improvements in Vulcanizers, of which the following is a specification.

This invention is an improved vulcanizer, especially adapted for use in repairing the inner tubes of automobile wheel pneumatic tires, the object of the invention being to provide an improved vulcanizer of this kind which is especially adapted to be attached to a manifold for heating thereby, so as to utilize the heat of the manifold for vulcanizing purposes and enable other heating means to be dispensed with and enable a chauffeur to very readily vulcanize a tire and with but little trouble or expense.

The invention consists in the construction, combination and arrangement of devices hereinafter described and claimed.

In the accompanying drawings:—

Figure 1 is a perspective view of a vulcanizer constructed and arranged in accordance with my invention.

Fig. 2 is a vertical sectional view of the same.

Fig. 3 is a detailed sectional view of the same.

In the embodiment of my invention I provide a block or body 1 which is hollow and contains a chamber 2 for the reception of water, the said block or body having a filler opening 3 at the upper side and a suitable plug 4 to close said opening. The block or body is provided on one side with a recess 5 adapted to receive and fit on one side of a manifold, indicated at *a*, and to enable the block or body to be securely fastened on the manifold I provide the block at a point midway between its ends with a stud 6 on the upper side and a lug 7 on its lower side. A metallic strap 8 has an opening at one end to receive the stud and said strap is adapted to pass around the manifold and is provided at the free end, which is outwardly turned, with an opening for the reception of an adjusting and securing bolt 9 which bolt also passes through an opening in the lug 7 and is provided with a suitable nut 10. The outer side of the block is recessed and provided with a concave face 11 on which a sheet of asbestos is placed. At the ends of the block or body are lugs 12 each of which has an opening for the reception of a T-bolt 13 and also has, on the side next the manifold a transversely arranged recess 14 for the reception of the head of one of the T bolts.

A clamping plate or top plate 15 is provided which has a convex inner surface 16 corresponding with the concave outer surface 11 of the block or body. The said plate has reinforce flanges 17 on its outer side and is provided at its ends with lugs 18 which have openings for the reception of the T-bolts. Each T-bolt has a suitable winged nut 19.

A suitable quantity of water is kept in the chamber of the block or body which serves, when heated to the boiling point, to retain sufficient heat in the vulcanizer, for vulcanizing purposes, after the motor has been stopped. The vulcanizing of the tire tube is effected in the usual way and as will be understood, the vulcanizer enabling the tube to be securely clamped between the opposing faces of the block and the plate during the vulcanizing process. The asbestos sheet prevents the plate 15 from becoming too highly heated and also protects the back of the tire tube from excessive heat while the same is being vulcanized. By the provision of the transverse recesses in the lugs of the block and by the provision of the T-heads of the bolts, which bear in said recesses, the bolts are prevented from casually turning and may yet be very readily removed from the vulcanizer when desired.

While I have herein shown and described a preferred form of my invention, I would have it understood that changes may be made in the form, proportion and construction of the several parts, without departing from the spirit of my invention and within the scope of the appended claims.

Having thus described my invention, I claim:—

1. A vulcanizer of the class described, comprising a block or body having a water receiving chamber and also having a concave face on one side adapting the block or body to bear against one side of the manifold, said block or body having an attaching band to pass around the manifold and means to secure the band; a plate, said plate and the block or body having end lugs, and clamping bolts engaging the lugs of the block or body and plate and detachably and adjustably securing the latter.

2. A vulcanizer of the class described, comprising a block or body having a water receiving chamber and also having a concave face on one side adapting the block or body to bear against one side of the manifold, said block or body having an attaching band to pass around the manifold and means to secure the band; a plate, said plate and the block or body having end lugs, and clamping bolts engaging the lugs of the block or body and plate and detachably and adjustable securing the latter, said bolts having T-heads and the lugs of the block or body having recesses to receive said T-heads.

In testimony whereof I affix my signature.

SAMUEL D. ORSER.